United States Patent
Kerfoot, Jr. et al.

(10) Patent No.: US 9,300,158 B2
(45) Date of Patent: Mar. 29, 2016

(54) METHOD AND APPARATUS FOR LOADING VOLTAGE THRESHOLDS FROM A BATTERY FOR A DEVICE

(71) Applicant: MOTOROLA SOLUTIONS, INC, Schaumburg, IL (US)

(72) Inventors: Roy L. Kerfoot, Jr., Lilburn, GA (US); Jeffrey L. Cutcher, Plantation, FL (US); John E. Herrmann, Suwanee, GA (US); Robert J. Higgins, Plantation, FL (US); Victor C McKeighan, Parkland, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 60 days.

(21) Appl. No.: 14/089,788

(22) Filed: Nov. 26, 2013

(65) Prior Publication Data
US 2015/0147983 A1 May 28, 2015

(51) Int. Cl.
*H04W 52/02* (2009.01)
*H02J 7/00* (2006.01)
*H04B 1/3883* (2015.01)

(52) U.S. Cl.
CPC . *H02J 7/007* (2013.01); *H02J 7/00* (2013.01); *H02J 7/0003* (2013.01); *H02J 7/0004* (2013.01); *H04B 1/3883* (2013.01); *H04W 52/0277* (2013.01); *H02J 2007/0096* (2013.01); *H02J 2007/0098* (2013.01)

(58) Field of Classification Search
CPC ..................... G01R 19/16542; G01R 31/3651; H02J 9/005
See application file for complete search history.

(56) References Cited

U.S. PATENT DOCUMENTS

| | | | |
|---|---|---|---|
| 5,684,387 A | 11/1997 | Patino | |
| 5,804,894 A | 9/1998 | Leeson et al. | |
| 5,818,197 A | 10/1998 | Miller et al. | |
| 6,153,950 A | 11/2000 | Hirano et al. | |
| 6,173,350 B1 * | 1/2001 | Hudson et al. | 710/100 |
| 6,310,556 B1 | 10/2001 | Green et al. | |
| 7,392,099 B2 * | 6/2008 | Atkinson et al. | 700/22 |
| 8,264,203 B2 | 9/2012 | Darilek et al. | |
| 8,369,807 B2 * | 2/2013 | Mikhemar et al. | 455/130 |
| 8,407,018 B2 * | 3/2013 | White et al. | 702/63 |

(Continued)

FOREIGN PATENT DOCUMENTS

| | | |
|---|---|---|
| EP | 2051157 A1 | 4/2009 |
| WO | 9810610 A1 | 3/1998 |

(Continued)

OTHER PUBLICATIONS

PCT International Search Report Dated Mar. 17, 2015 for Counterpart Application PCT/US2014/066330.

*Primary Examiner* — David Bilodeau
(74) *Attorney, Agent, or Firm* — Barbara R. Doutre

(57) ABSTRACT

A method and apparatus for determining whether to enable a functionality of a battery powered device upon connection to a battery is embodied by providing at least one voltage threshold in a memory of the battery that corresponds to a usable operating range limit of the battery and that is accessible by the battery powered device. Upon connection to the battery, the battery powered device acquires the voltage threshold or thresholds from the battery and programs itself with the threshold or thresholds. The battery powered device then compares a voltage of the battery to the threshold or threshold to determine whether the enable the functionality.

17 Claims, 5 Drawing Sheets

(56) References Cited

U.S. PATENT DOCUMENTS

| | | |
|---|---|---|
| 8,441,232 B2* | 5/2013 | Hayasaki ............ 320/132 |
| 8,446,142 B2* | 5/2013 | Bucur et al. ............ 323/367 |
| 2006/0017581 A1 | 1/2006 | Schwendinger |
| 2012/0306655 A1 | 12/2012 | Tan |
| 2013/0018610 A1* | 1/2013 | Yamauchi et al. ............ 702/63 |

FOREIGN PATENT DOCUMENTS

| | | |
|---|---|---|
| WO | WO9950947 A1 | 10/1999 |
| WO | WO2009129107 A1 | 10/2009 |

* cited by examiner

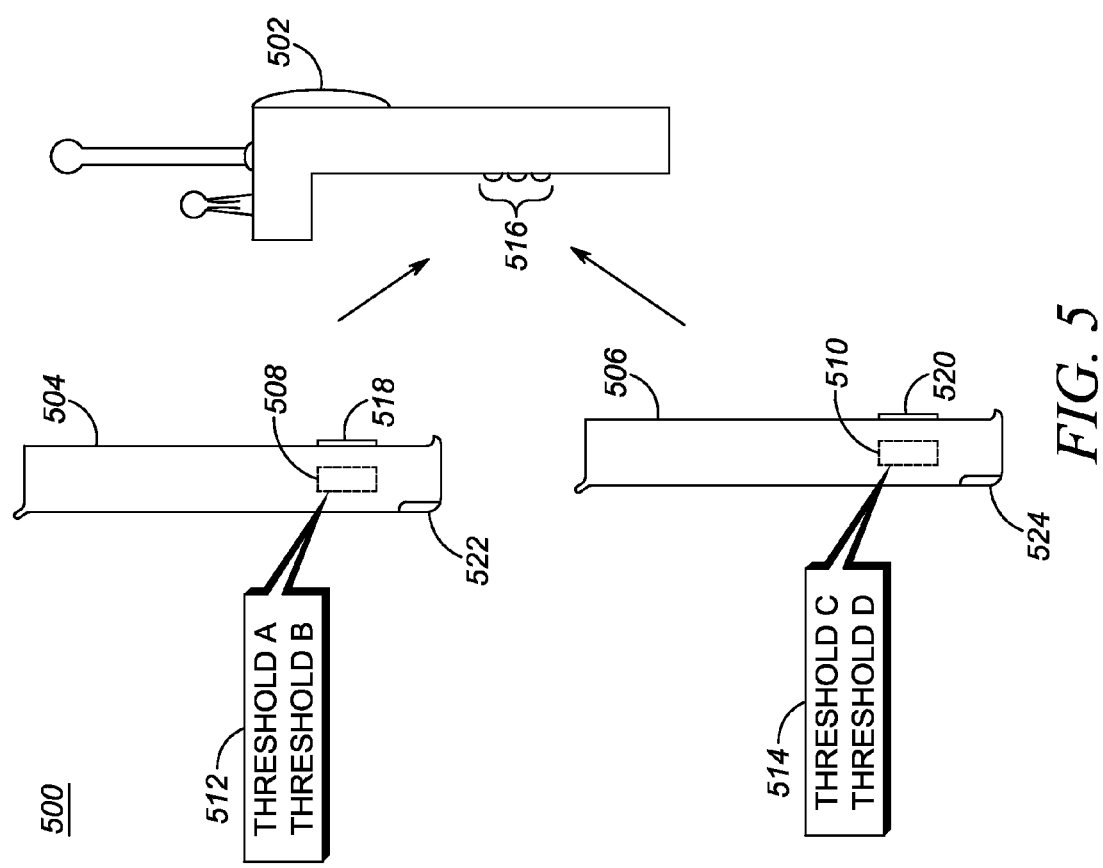

METHOD AND APPARATUS FOR LOADING VOLTAGE THRESHOLDS FROM A BATTERY FOR A DEVICE

FIELD OF THE DISCLOSURE

The present disclosure relates generally to battery powered, portable devices, and more particularly to battery powered devices that can use different batteries, each having different electrochemical cell designs, and which enable or disable device functionality based on thresholds corresponding to battery voltage thresholds for different battery types.

BACKGROUND

Newer Lithium-ion (Li-ion) chemistries for rechargeable electrochemical cells have usable voltage ranges significantly different than the conventional voltage range of approximately 3.0 to 4.2 volts. The usable voltage ranges of some newer Li-ion systems extend well below the conventional voltage range. Some battery-powered electronic devices may be able to use both conventional and newer battery cell chemistries as they can be packaged in similar housings or battery packages designed for those devices. However, conventional battery-powered electronic devices are not be designed to take full advantage of the lowest end of the usable voltage range of newer battery cell chemistries. As a result, either of two scenarios will occur which could compromise user experience when the newer-chemistry battery is at a low state of charge. In one case, when powering up the battery-powered device, the device may assert too great a load on the battery, causing battery voltage to sag below the minimum operating voltage of the electronic device. Second, the device may assert its load on the battery for too long a time, draining battery energy, resulting in low battery voltage, which drops below the minimum operating voltage of the electronic device. In both cases, the electronic device would unexpectedly shut down. This issue may be exacerbated when various device features or functions are engaged, varying the load on the battery, resulting in device shut-down when a high-current-load function is engaged.

A sophisticated battery powered device that has a varied power demand can include a power up threshold and an under-voltage threshold setting to prevent inadvertent shut-down of the battery powered device. The power up threshold is a sufficient voltage level (of the battery) at which the device can be fully functional, including high power demand functionality, to ensure there is a desirable amount of charge in the battery. The power up threshold is observed when the device is turned on, and determines that the battery voltage is below the power up threshold. Until the battery voltage rises above the power up threshold, the device will not allow full functionality, if any. Likewise, the device will begin shutting off functionality as the battery voltage is decreasing and falls below the under-voltage limit. However, these thresholds are programmed into the device, and may not apply to new battery systems that are developed subsequently to the manufacture of the device.

Accordingly, there is a need for a method and apparatus for a device to determine and use voltage limits appropriate for a variety of battery systems, including battery systems developed after the manufacture of the device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is line drawing diagram of a portable two-way radio device system including multiple different battery types that can be used to power the portable two-way radio device.

Figure 1:
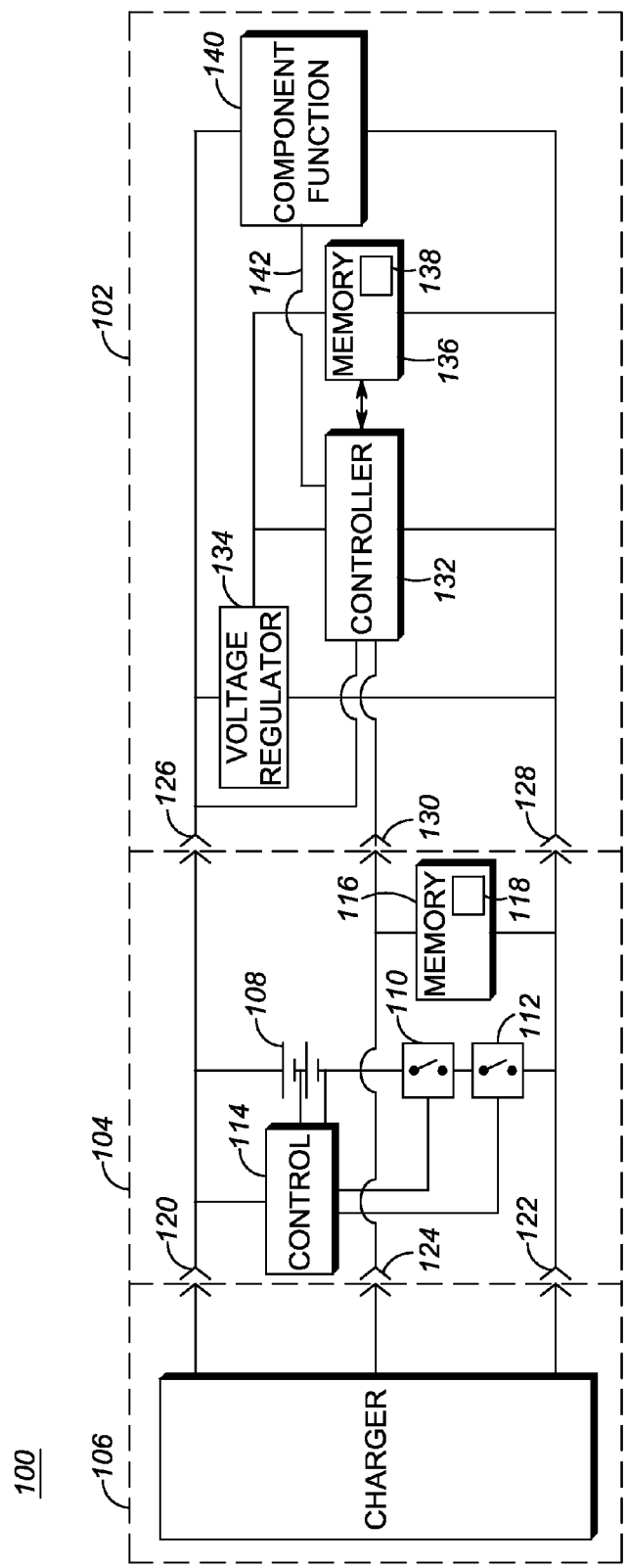
FIG. 1 is a block of a battery powered electronic device system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the disclosure include a method for setting operating parameters in a battery powered device that includes detecting connection to a battery prior to fully powering up the battery powered device. The method also includes determining, by the battery powered device, that the battery contains a memory having operating parameters stored therein. The operating parameters including at least one voltage threshold. The method further includes the battery powered device programming itself with the at least one voltage threshold, and wherein the at least one voltage threshold is compared to a voltage of the battery by the battery powered device to determine whether to enable a functionality of the battery powered device should be enabled.

FIG. 1 is a block of a battery powered electronic device system 100, in accordance with some embodiments. The system includes an electronic device 102 that is connected to a battery 104. The battery can be further connected to another device, such as a charger 106. The battery 104 includes one or more rechargeable battery cells 108. The battery cells 108 utilize an electrochemical system for storing and providing electrical charge and have one or more particular voltage limits to ensure optimum longevity and operation of the battery cells 108. In some embodiments the battery 104 further includes one or more protection switches, such as an under-voltage switch 110 and an over-voltage switch 112, that are controlled by a control circuit 114. The control circuit 114 can monitor the voltage across each battery cell, and will open the over-voltage switch 112 if any cell voltage exceeds the over-voltage threshold, or open the under-voltage switch 110 if the voltage across any cell drops below an under-voltage threshold. The battery 104 further includes a data storage device such as a memory 116 that includes one or more voltage thresholds 118. In some embodiments the memory includes a power up threshold and an under-voltage threshold that can be used by the device 102. In some embodiments can include one or more other thresholds that can be used by the charger 106. The charger 106 connects to the battery 104 at a positive charger contact 120, a negative charger contact, and a charger information contact 124. The charger information contact 124 is connected to the memory 116 and allows the charger 106 to interact with the memory 116. In some embodiments, upon the battery 104 being connected to the charger 106, the charger 106 can read the memory 116 to obtain charging parameters that can include the one or more voltage thresholds to be used by the charger 106 in charging the battery 104. For example, the charging parameters read by the charger 106 from the memory 116 can include, for example, a charge capacity, a battery type (e.g. battery cell chemistry), an over-voltage threshold, and an under-voltage threshold. If the battery voltage is below the under-voltage threshold, the charger 106 can apply a low level charge current until the battery voltage rises above the under-voltage threshold. Similarly, the charger 106 will adjust charging current to prevent the battery voltage from exceeding the over-voltage threshold while charging the battery 104.

Similarly, the device 102 can read the memory 116 over the device information contact 130. A controller 132 in the device 102 can acquire one or more voltage thresholds 118 and other parameters, and store them locally, such as in a memory 136 as a local copy of the voltage thresholds 138. The voltage thresholds 138 can be used by the controller, upon performing instruction code (which can also be in memory 136) in carrying out the operation of the device 102. The controller and memory, as well as other components can be powered from, for example, a voltage regulator 134, which provides a regulated direct current (DC) level from the battery voltage between the positive device contact 126 and negative device contact 128. Generally the voltage regulator 134 requires that the battery voltage be higher than the regulated voltage level provided to the controller 132. The device 102 also includes at least one component or other functionality 140 that is under direct or indirect control of the controller 132. The functionality 140 can be circuit or sub-system that, when operating, uses a relatively high power level. Accordingly, the voltage thresholds 138 can include a power up threshold. The power up threshold is the minimum battery voltage level at which the device will enable the component or functionality 140. In some embodiments the component or functionality 140 can include most of the operable portions of the device. While the battery voltage is below the power up threshold, the functionality 140 remains disabled or off, and the device 102, via, for example, controller 132, can provide a user-perceptible indication that the device is unable to enable the functionality 140, such as, for example, a visual indication on a graphical display. If the battery is connected to the charger 106 and is being charged, if the battery voltage is below the power up threshold, the battery voltage will rise over time. Once the battery voltage exceeds the power up threshold, the controller 134 will enable the functionality 140. In some embodiments there can be more than one functionality 140, each having a different power up threshold, and as battery voltage rises each corresponding functionality can be enabled as each power up threshold is exceeded. Similarly, the voltage thresholds 138 can include an under-voltage threshold that can be lower than the power up threshold, and that dictates that the controller disable functionality 140, for example, when the battery voltage falls below the under-voltage threshold. The difference between the power up and under voltage thresholds can be due to the effect of charging versus discharging on battery voltage as well as the characteristics of the electronics and functions of the device 102. To read the data in the memory 136, the device 102 has to contend with the charger 106, which can also access the memory 116. The arrangement where each of the device 102 and charger 106, or other device, can access the same memory is an example of a multi-master arrangement. Each device that can interact with the memory in the battery is considered a "master." The memory 116 can use a single wire serial communication protocol. Thus, a multi-master contention protocol is used by both the device 102 and the charger 106 in accessing the memory 116. For example, immediately prior to attempting to access the memory 116, an accessing "master" (e.g. the device 102, or the charger 106) will first listen to the information line over device information contact 130 or charger information contact 124. If the device attempting to access the memory detects activity, the device attempting access will wait for a period of time before attempting access again.

The device 102 can be any of a variety of electronic, battery powered devices. In some embodiments the device 102 can be a portable two-way radio device such as that used by public safety, rescue, and other personnel. In a portable two-way radio device the functionality 140 can be a transmitter function of the portable two-way radio device. Since a transmitter will draw battery current at a level that is typically on the order of one or two orders of magnitude higher than the idle current, a transmission event can cause battery voltage to substantially drop while transmitting. Accordingly, the portable two-way radio device (i.e. as device 102) can enable the transmitter functionality (e.g. functionality 140) only when the battery voltage is above the power up threshold.

Figure 2:
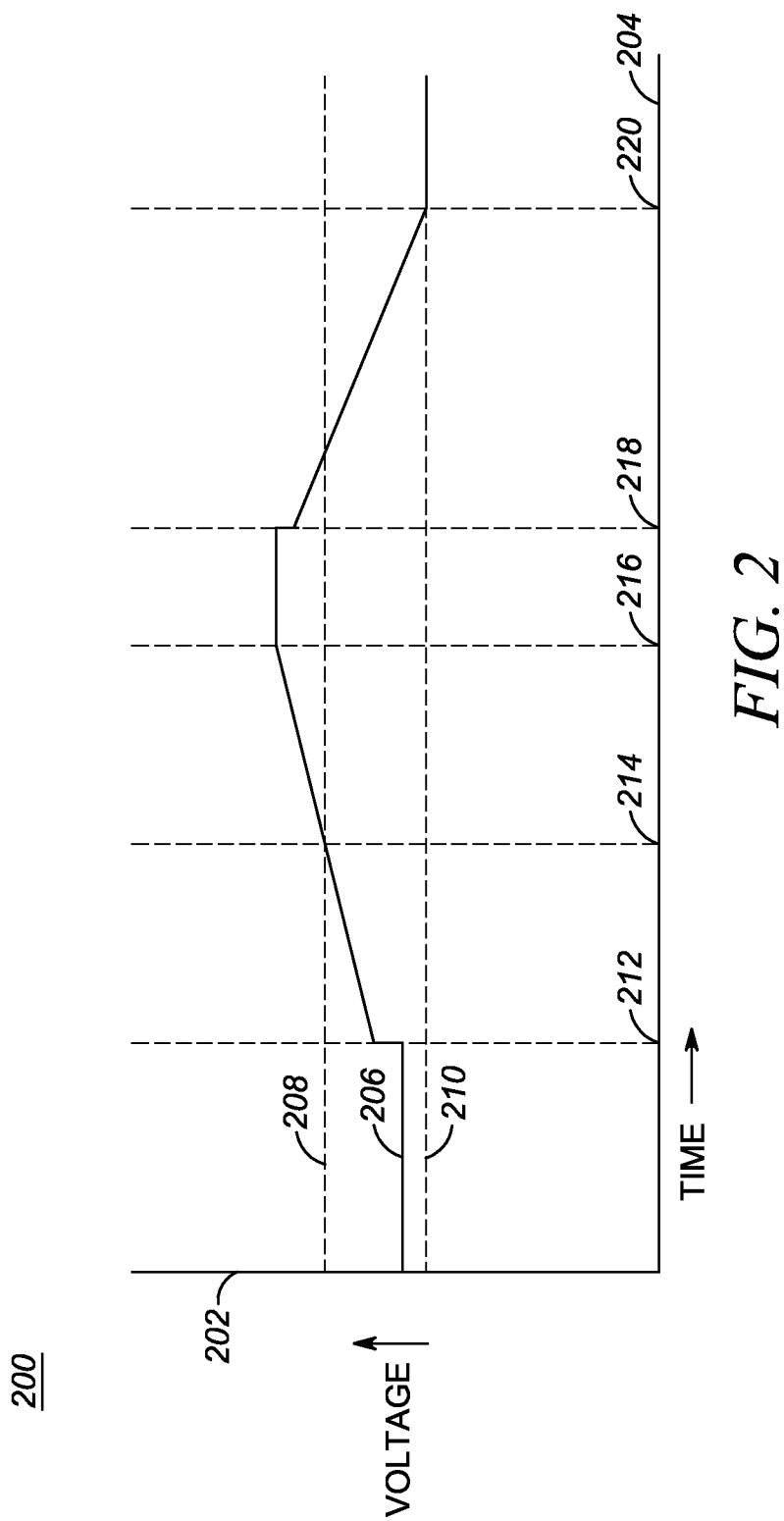
FIG. 2 is a graph chart of voltage versus time in a battery powered electronic device system, in accordance with some embodiments.

FIG. 2 is a graph chart 200 of voltage 202 versus time 204 in a battery powered electronic device system, in accordance with some embodiments. The battery voltage 206 is charted in an exemplary fashion here. No scale should be derived from the proportions of the chart 200, rather, the chart 200 has been drawn in a way to more clearly explain the operation of embodiments of the disclosure. In addition to the battery voltage 206, there is shown as dashed lines a power up threshold 208 and an undervoltage threshold 210. Initially, prior to time 212, the battery having battery voltage 206 is only attached to a device that is powered by the device. The battery voltage is below the power up threshold 208. Accordingly, the device will not enable some component or functionality of the device. At time 212, the battery, while attached to the device, is further connected to a charger at a set of charger contacts, and the charger, in response to detecting the battery commences providing a charging current which causes the battery voltage to initially jump up, and then continue to increase over time. At time 214 the battery voltage, due to the battery being charged, crosses the power up threshold 208. Accordingly, at time 214, or shortly thereafter, the device can enable the previously disabled component or functionality. At time 216 the battery voltage reaches a charging voltage limit, and the charger begins decreasing the charging current to maintain the battery voltage substantially constant as the battery continues to charge. The constant current/constant voltage type of charge regime is common in lithium based systems, but other charge regimes can be used as well. At time 218 the charging current ceases. The charging current be cease due to the battery being removed from the charger, or the charger determining that the battery is fully charged. As a result of the charging current being ceased, the battery voltage will drop. From 218 to time 220, the device continues to operate at full functionality and discharges the battery. As a result, the battery voltage decreases as the device uses battery charge to operate. At time 220 the battery voltage drops to the undervoltage threshold 210, and in response the device shuts off functionality of the device to avoid issues such as errant operation due to insufficient voltage and tripping under-voltage protection in the device.

Figure 3:
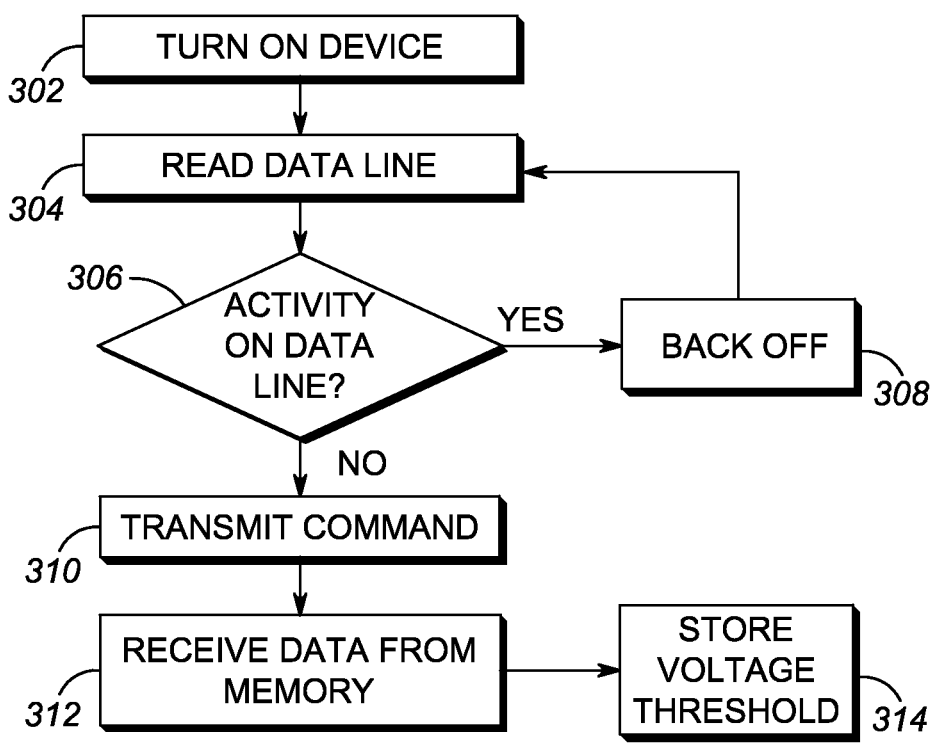
FIG. 3 is a flow chart diagram of a method of acquiring a voltage threshold from a battery, in accordance with some embodiments.

FIG. 3 is a flow chart diagram of a method 300 of acquiring a voltage threshold from a battery, in accordance with some embodiments. For the present method 300, a device is connected to a battery, meaning a rechargeable battery pack. The battery contains a memory or other information storage device, and has a set of device contacts for connecting to a device that is powered by the battery, and a set of charging contacts to connect to a charger, or the battery may have one set of contacts for connecting to a device where the device is further connected to a charger or a second device capable of interacting with the battery through the device connected at the contacts to the battery. Both the device and charger can access, and interact with, the memory in the battery. The first step 302 is to turn on or otherwise enable the device. The device initially has no information about the battery, and does not know the appropriate voltage threshold or thresholds to be used in operating from the battery. Accordingly, prior to enabling any additional functionality, the device attempts the read the memory in step 304. The device uses a multi-master contention protocol, and so preliminarily determines if there is activity on the data line connected to the memory in step 306. The memory line is the line connected to the device information contact over which the device interacts with the memory. If there is activity detected, the device waits a period of time, which can be referred to as a back off time, in step 308. Once the data line is clear of activity, the device can then transmit a read command to the memory in step 310. Steps 340, 306, and 308 are part of a multi-master contention protocol for accessing the memory using a single wire serial communication protocol. In response to the device transmitting the read command in step 310, the memory transmits contents of the memory using the single wire serial communication protocol, and the device receives the data in step 312. Among the data received can be one or more voltage thresholds that are then stored by the device in step 314. By "stored" it is meant that the device loads the voltage threshold or thresholds for use by instruction code that is performed by a controller of the device in enabling or disabling functionality of the device based on the voltage threshold(s).

Figure 4:
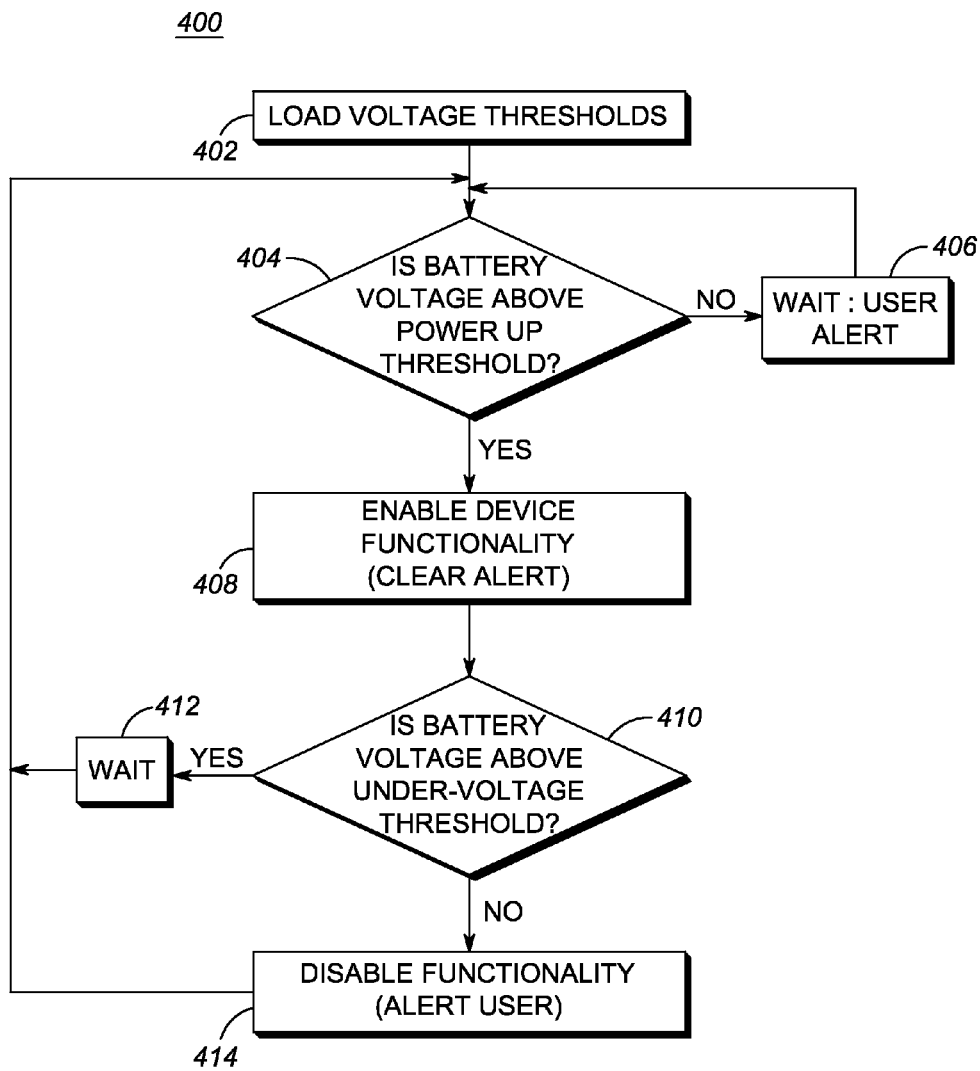
FIG. 4 is a flow chart diagram of a method of operating an electronic device, in accordance with some embodiments.

FIG. 4 is a flow chart diagram of a method 400 of operating an electronic device, in accordance with some embodiments. The method 400 can be a continuation of method 300 of FIG. 3. Thus, in step 402, the method loads the voltage thresholds obtained from the memory in the battery. Thus, step 402 can represent an abstraction of all, or step 314, of method 300. At step 402, the device has not enabled full functionality. In step 404, the device determines whether the present battery voltage is above a power up threshold, which is one threshold that is received from the battery in step 312 of method 300. If the present battery voltage is not above the power up threshold, the device maintains some functionality in a disabled state and waits in step 406. While waiting in step 406 (and while cycling between step 404 and step 406) the device can provide a user-perceptible alert or indication that the battery voltage is insufficient to enable full device functionality. Once the battery voltage rises above the power up threshold, assuming it does, the method 400 moves to step 408 where the device enables the functionality in step 408, and the device can clear the alert that was set in step 406, or otherwise indicate that full functionality is enabled. Subsequent to step 408, the device is operating normally. If the device and battery were connected to a charger, and then removed, the battery voltage will decrease as the device continues operating, using battery charge. Thus, in step 410 the device determines whether the present battery voltage is above an under-voltage threshold. The under-voltage threshold is another voltage threshold that can be acquired by the device in step 312 of method 300 in FIG. 3. If the battery voltage is above the under-voltage threshold, the method 401 can wait in step 412. The method will cycle through steps 404, 408, 410, 412 while the battery voltage remains above the under-voltage threshold. Once the battery voltage falls below the under-voltage threshold, the method proceeds to step 414 and shuts off or disables a functionality of the device, and the method returns to step 404. The method 400 will cycle through steps 404-414 unless the device is completely shut off or disconnected from the battery, at which point the device will begin at step 302 of method 300 upon being turned back on.

FIG. 5 is line drawing diagram of a portable two-way radio device system 500 including multiple different battery types that can be used to power the portable two-way radio device 502. The system 500 includes at least two batteries 504, 506, either of which can be connected to the portable two-way radio device 502 to power the portable two-way radio device. The batteries 504, 506 can be rechargeable batteries, and battery 504 is a first type of battery while battery 506 is a second type of battery. Each of the batteries 504, 506, being different types (e.g. using different rechargeable electrochemical system), can have different voltage thresholds. Battery 504 contains a memory 508 that stores battery information including a first set of thresholds 512 that include thresholds A and B. Battery 506 includes a memory 510 that stores battery information including a second set of thresholds 514 that include thresholds C and D, where A, B. C, and D can be different values corresponding to different voltage levels. If battery 504 is connected to the portable two-way radio device 502, then the portable two-way radio device 502 will load thresholds 512 and control the enabling and disabling of functionality such as a transmitter functionality based on the values of thresholds A and B. If battery 506 is connected to the portable two-way radio device 502, then the portable two-way radio device 502 will load thresholds 514 and control the enabling and disabling of functionality such as a transmitter functionality based on the values of thresholds C and D. Either of the batteries 504, 506 can be connected to the portable two-way radio device by mating mechanical features, as is well known, such that device contacts 516 mate with corresponding contacts 518, 520, respectively, on batteries 504, 506. Each of the batteries 504, 506 further include a set of charging contacts 522, 524, respectively, for connecting the batteries 504, 506 to a charger, which can be performed while a given battery 504, 506 is connected to the portable two-way radio device 502.

Accordingly, embodiments of the disclosure provide the benefit of allowing a battery powered device to control enablement and disablement of functionality in the device based on battery voltage thresholds for each different battery type, including existing battery types as well as battery types that may be developed in the future. Existing approaches that "hard code" voltage threshold into the device do not allow the use of different battery types, especially battery types that have yet to be developed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for setting operating parameters in a battery powered device, comprising:
   detecting connection to a battery prior to fully powering up the battery powered device,
   determining, by the battery powered device, that the battery contains a memory having operating parameters stored therein, the operating parameters including at least two voltage thresholds, wherein the at least two voltage thresholds comprise a power up threshold and an undervoltage threshold;
   the battery powered device acquiring from the memory in the battery the power up threshold and the undervoltage threshold; and
   the battery powered device programming itself with the power up threshold and the undervoltage threshold, and wherein a voltage of the battery is compared to the power up threshold and the undervoltage threshold by the battery powered device;
   the battery powered device being substantially disabled between the undervoltage threshold and the power up threshold;
   the battery powered device fully powering when the battery voltage of the battery is above the power up threshold;
   the battery powered device operating at full functionality, when the battery is discharging between the power up threshold and the undervoltage threshold, resulting in the battery voltage decreasing as the battery powered device uses the battery charge for operation; and
   the battery powered device shutting off at least a portion of the battery powered device when the battery voltage of the battery falls below the undervoltage threshold.

2. The method of claim 1, wherein acquiring the at least two voltage thresholds is performed by reading the memory of the battery by the battery powered device using a multi-master contention protocol to access the memory in the battery by the battery powered device.

3. The method of claim 2, further comprising:
   detecting that another device is accessing the memory in the battery, and waiting, in accordance with the multi-master contention protocol, before reading the memory in the battery by the battery powered device.

4. The method of claim 1, wherein acquiring the at least two voltage thresholds is performed over an information contact of the battery powered device that interfaces with a corresponding information contact of the battery.

5. The method of claim 1, wherein acquiring the at least two voltage thresholds comprises an acquiring a first voltage threshold and a second voltage threshold, wherein the first voltage threshold is higher than the second voltage threshold, the method further comprises:
when a battery voltage of the battery is above the first voltage threshold the battery powered device enabling a functionality of the battery powered device; and
subsequent to enabling the functionality, when the battery voltage falls below the second voltage threshold, the battery powered device disabling the functionality.

6. The method of claim 1, further comprising enabling and disabling functionality based on battery voltage thresholds corresponding to different battery chemistry types.

7. The method of claim 1, wherein the at least two voltage thresholds are based on different battery chemistry types.

8. A battery powered device, comprising:
a contact interface for connecting to a battery;
a controller coupled to at least one contact of the contact interface, wherein the controller, in response to connection of the battery powered device to the battery, reads at least two voltage thresholds from the battery, wherein the at least two voltage thresholds cause the controller to either enable or disable a functionality of the battery powered device based on whether a battery voltage of the battery is above or below one of the at least two voltage thresholds, wherein the at least two voltage thresholds comprise: a power up threshold and an undervoltage threshold; and
the battery powered device being substantially disabled when a battery voltage of the battery powered device is rising between the undervoltage threshold and the power up threshold;
the battery powered device being fully operational when the battery voltage of the battery is above the power up threshold;
the battery powered device operating at full functionality when the battery is discharging between the power up threshold and the undervoltage threshold, resulting in the battery voltage decreasing as the battery powered device uses the battery charge for operation; and
the battery powered device shutting off at least a portion of the battery powered device when a battery voltage of the battery falls below the undervoltage threshold.

9. The battery powered device of claim 8, wherein the controller reads the at least two voltage thresholds from the battery using a multi-master contention protocol.

10. The battery powered device of claim 8, wherein acquiring the at least two voltage thresholds is performed by reading the memory of the battery by the battery powered device using a multi-master contention protocol to access the memory in the battery by the battery powered device.

11. The battery powered device of claim 10, wherein the controller detects that a charger is accessing a memory in the battery in which the at least two voltage thresholds is stored, and waits in accordance with the multi-master contention protocol before reading the memory in the battery.

12. The battery powered device of claim 8, wherein the controller reads the at least two voltage thresholds over an information contact of the battery powered device that interfaces with a corresponding information contact of the battery.

13. The battery powered device of claim 8, wherein the at least two voltage thresholds includes a first voltage threshold and a second voltage threshold, wherein the first voltage threshold is higher than the second voltage threshold, the controller enables a functionality of the battery powered device when a battery voltage of the battery is above the first voltage threshold, and the controller disables the functionality when, subsequent to enabling the functionality, the battery voltage falls below the second voltage threshold, the battery powered device disabling the functionality.

14. The battery powered device of claim 8, wherein the battery powered device is a portable two-way radio device.

15. A method of operating a portable two-way radio device, comprising:
detecting connection of a battery to the portable two-way radio device;
loading, from a memory in the battery, at least two voltage thresholds including a power up threshold and an undervoltage threshold associated with the battery, the undervoltage threshold having a value lower than the power up threshold;
determining a present battery voltage of the battery; and
disabling a transmitter functionality when the battery voltage is rising between the undervoltage threshold and the power up threshold;
enabling the transmitter functionality when the battery voltage is above the power up threshold;
maintaining the transmitter functionality when the battery voltage falls between the power up threshold and the undervoltage threshold as the battery is being discharged; and
disabling the transmitter functionality when the battery voltage falls below the undervoltage threshold.

16. The method of claim 15, wherein loading the at least two voltage thresholds comprises accessing the memory using a multi-master contention protocol as part of a single wire serial communication protocol.

17. The method of claim 15, further comprising, subsequent to determining the present battery voltage, determining that the present battery voltage is below the power up threshold.

* * * * *